United States Patent
Lehre et al.

(10) Patent No.: US 7,630,061 B2
(45) Date of Patent: Dec. 8, 2009

(54) RADAR SENSORS FOR MOTOR VEHICLES

(75) Inventors: Klaus Lehre, Malsch (DE); Wolf Steffens, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/190,634

(22) Filed: Jul. 26, 2005

(65) Prior Publication Data
US 2007/0002305 A1    Jan. 4, 2007

(30) Foreign Application Priority Data
Aug. 5, 2004    (DE) .................... 10 2004 037 907

(51) Int. Cl.
*G01C 3/08* (2006.01)

(52) U.S. Cl. .................. 356/4.01; 356/4.1; 356/5.01; 356/5.15; 342/11

(58) Field of Classification Search ............ 356/4.01
See application file for complete search history.

(56) References Cited

U.S. PATENT DOCUMENTS

| | | | | |
|---|---|---|---|---|
| 4,447,149 A | * | 5/1984 | Marcus et al. ............. | 356/5.06 |
| 4,725,774 A | | 2/1988 | Davis et al. | |
| 4,769,646 A | | 9/1988 | Raber et al. | |
| 5,623,509 A | * | 4/1997 | Iwano et al. ............. | 372/45.01 |
| 5,677,902 A | | 10/1997 | Brazas, Jr. | |
| 5,905,457 A | * | 5/1999 | Rashid ................. | 342/70 |
| 5,914,811 A | | 6/1999 | Chen et al. | |
| 6,163,371 A | * | 12/2000 | Kato et al. ............. | 356/4.03 |
| 7,139,127 B2 | * | 11/2006 | Arnold et al. ............. | 359/571 |
| 2003/0053041 A1 | * | 3/2003 | Isogai et al. ............. | 356/4.01 |
| 2005/0187701 A1 | * | 8/2005 | Baney ................. | 701/117 |

FOREIGN PATENT DOCUMENTS

| | | |
|---|---|---|
| DE | 102 07 437 | 9/2003 |
| EP | 1 467 223 | 10/2004 |

* cited by examiner

*Primary Examiner*—Thomas H Tarcza
*Assistant Examiner*—Luke D Ratcliffe
(74) *Attorney, Agent, or Firm*—Kenyon & Kenyon LLP

(57) ABSTRACT

A radar sensor for motor vehicles, having an optical system which subdivides a radar beam generated by a single antenna element into a plurality of beam components that are radiated in different directions, wherein the optical system has a diffraction grating.

11 Claims, 1 Drawing Sheet

RADAR SENSORS FOR MOTOR VEHICLES

FIELD OF THE INVENTION

The present invention relates to a radar sensor for motor vehicles, having an optical system which subdivides a radar beam, generated by an antenna element, into several beam components radiated in different directions.

BACKGROUND INFORMATION

Radar sensors are used in motor vehicles for locating other vehicles or other obstacles in the surroundings of one's own vehicle, and for measuring their distances and relative speeds, so that, for instance, an automatic distance control (ACC; adaptive cruise control) is made possible.

A radar sensor for this purpose is described in German Patent No. DE 102 07 437, which has several antenna elements situated next to one another, which, in connection with an optical system in the form of a plano-convex lens, generates several slightly divergent radar lobes. By using several radar lobes whose radar echoes are able to be received by the antenna elements and separately evaluated, a certain angular resolution capability of the radar sensor is achieved. Furthermore, in this known radar sensor, the lens is simultaneously developed at a part of its cross section as a prism by which, from each radar beam generated by a single antenna element, once more a beam component is coupled out that is directed slantwise downwards onto the roadway. This beam component, which hits the roadway surface already at a relatively short distance from the vehicle, is reflected from unevennesses in the roadway, and the radar echoes thus received may, for example, be used to measure the speed of the vehicle over the ground, independently of the signals of the wheel rotary speed sensors. By measuring the distance of the point of impingement of this beam component on the roadway surface, it is also possible to monitor the vertical calibration of the radar sensor. Since the radar echo from the roadway surface is present even when there are no vehicles in the locating range of the main beam of the radar sensor, a loss of sight of the radar sensor may also be detected in the light of the absence of these radar echoes, that may be caused, for instance, by snow or ice in front of the lens of the radar sensor.

SUMMARY OF THE INVENTION

The present invention provides a radar sensor in which the geometry of the beam components may be better adapted to the respective requirements.

According to the present invention, this is achieved by the optical system's having a diffraction grating.

A diffraction grating generates a diffraction pattern which has at least one secondary maximum besides a main maximum. The radar beam generated by the antenna element is thus subdivided into a number of beam components which correspond to the main maximum and to the secondary maxima of the diffraction pattern. The angle between the main maximum and the first secondary maximum is a function of the grating constant of the diffraction grating. Thus, using a diffraction grating having a sufficiently low grating constant, even in the case of thin lenses, into which a prism having sufficient refractive power could hardly be integrated, a large angle between the beam components may be achieved.

The diffraction grating may simply be placed before the lens as transmission grating or it may be developed in the flat surface of the lens, and, in this context, it may extend over the entire cross section of the lens. This has the advantage that the lens has the same numerical aperture for the deflected beam component corresponding to the first secondary maximum as for the main beam, so that the geometry of the deflected beam is not falsified so strongly by diffraction effects of the lens. An additional substantial advantage, especially for the loss of sight detection, is that the deflected beam, just as the main beam, also starts from the entire cross sectional area of the lens. Deposits of snow, ice or slush, that lead to a loss of sight of the sensor, consequently have the same effect on the deflected beam component, which is used for loss of sight detection, as on the non-deflected main beam.

By a suitable embodiment of the diffraction grating, for example, as a so-called blaze grating, an asymmetrical diffraction pattern may be achieved, in which all secondary maxima, except for the first secondary maximum, are extensively suppressed on one side of the principal maximum, so that the beam, similar to the case of a prism, is subdivided into only two beam components, namely a non-deflected main beam and a deflected secondary beam. Then, in the same way as with the radar sensor described in German Patent No. DE 102 07 437, the deflected beam may be directed slantwise onto the roadway surface, and used for measuring the absolute speed, for calibration control and/or for the detection of loss of sight. However, since, for the beam deflected with the aid of the diffraction grating, the entire numerical aperture of the lens is available, this beam is easier to focus.

Optionally, the diffraction grating may also be oriented vertically, so that the secondary beam is deflected to the side. In this case, the secondary beam may be used, for example, for the early detection of a driver's swinging in or for locating objects on side lanes or at the edge of the roadway. Then the diffraction grating may also be embodied in such a way that exactly two secondary beams are generated symmetrically to the main beam that correspond to the two first diffraction maxima. In this way, in the very short range of the vehicle, monitoring both side lanes or of the left side lane and the right roadway edge is made possible. By evaluating the radar echoes that are generated by the side lanes, for example, at left and right guardrails or guardrail posts, it is also possible to detect in which lane of the roadway one's own vehicle is located. A differentiation between radar echoes that are generated by the main beam on the one hand, and by secondary beams on the other hand, is, for instance, made possible in that objects that are detected by the secondary beams will have a very small distance from one's own vehicle, already at their first detection. In the case of standing objects or objects that are slower than one's own vehicle, a differentiation between echos of the left and the right secondary beam, in the case of angle-resolving radar sensors, is made possible in that the azimuth angles of the located object change in the opposite direction.

According to one refinement of the present invention, it is also possible to vary or modulate the grating constant of the diffraction grating dynamically. This may be done, for instance, by producing the diffraction grating using electronically controllable elements, for example, using piezoelectric elements or using photon crystal technology in a suitable substrate, so that the grating parameters are able to be controlled electronically. This also opens up the possibility of enlarging the locating angle range of the radar sensor, or to improve the angular resolution capability, by "scanning" the environment by periodic change in the angle of deflection of the secondary beams.

DETAILED DESCRIPTION

Figure 1:
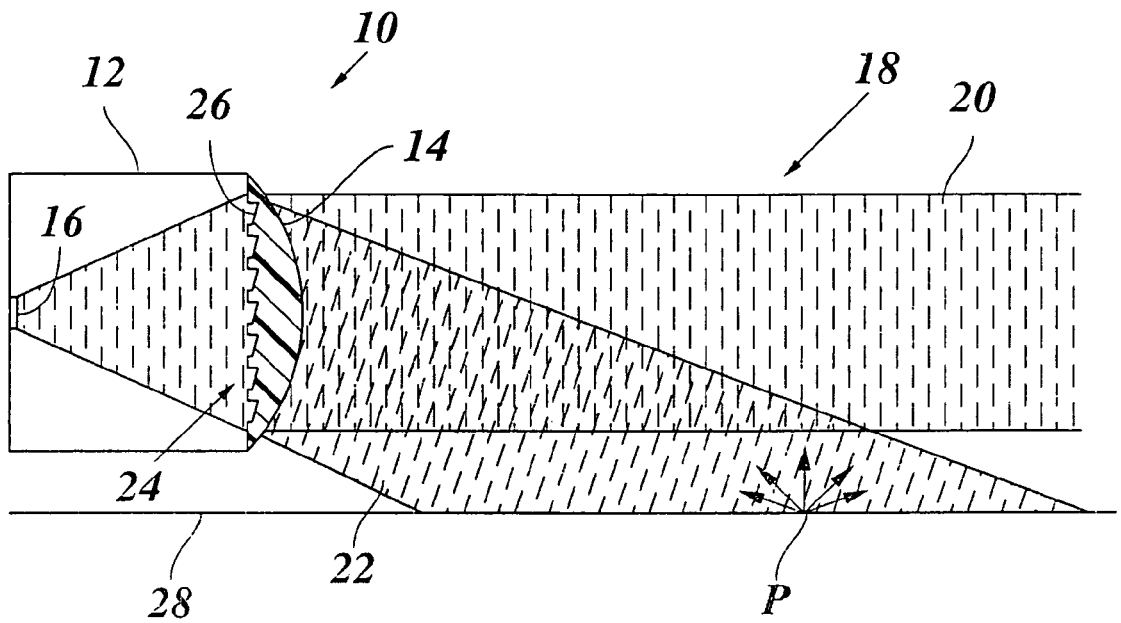
FIG. 1 shows a schematic section through a radar sensor according to the present invention.

In FIG. 1 a radar sensor 10 is shown schematically in a vertical section which, for instance, is installed in the front of a motor vehicle. A housing 12 of the radar sensor is closed at the front end by a plano-convex lens 14, which is made of a plastic material having a suitable refractive index that is transparent to microwaves. On the inside of housing 12, approximately in the focal plane of lens 14, there are several antenna elements 16 of which only one is seen in the drawing, and they are situated side by side in such a way that, in connection with lens 14, they generate several radar beams 18 that are slightly angularly offset against one another, which lie in a horizontal plane that goes through the optical axis of lens 14 and is perpendicular to the plane of the drawing in FIG. 1. By evaluating the intensity differences and phase differences between the radar echoes received by the different antenna elements 16, the angle of azimuth of the located objects may be determined.

However, even radar beam 18, generated by a single antenna element 16, is here once more subdivided into two beam components 20, 22, namely a main beam running approximately horizontally, and a secondary beam 22 directed slantwise at the roadway surface. This beam subdivision is achieved by a diffraction grating 24 which, in the example shown, is formed by a sequence of grooves 26 in the planar surface of lens 14. The diffraction effect comes about because the empty space in the grooves 26 has a lower optical density than the ribs of the material of lens 14 that have been left standing, so that phase differences in the radiation emitted by antenna element 16 are brought about. Instead, one might optionally use protruding ribs instead of grooves 26, or strips embedded in the lens made of a material having an optical density deviating from that of the material of lens 14. In principle, lattice rods made of a material that is opaque to microwave radiations would also be conceivable, but this would lead to losses in the overall intensity of radar beam 18.

The angle between main beam 20 and secondary beam 22 is a function of the grating constant of diffraction grating 24, that is, the distance between grooves 26, and this distance is approximately of an order of magnitude of the wavelength of the microwaves, which amounts to approximately 3.9 mm for a 77 kHz radar.

Secondary beam 22 corresponds to the first diffraction maximum of diffraction grating 24. In the example shown, diffraction grating 24 is a transmission grating, and especially a so-called blaze grating, in which all diffraction maxima, with the exception of the first secondary maximum, are suppressed on one side of the main maximum. As is known from the theory of diffraction gratings (blazed gratings), this may be achieved by the grooves 26 having an asymmetrical prism profile that is so tuned to the grating constant and the index of refraction of the material that the undesired secondary maxima are removed by destructive interference. Consequently, the entire radiation energy concentrates on the two beam components 20, 22.

The intensity ratio of main beam 20 and secondary beam 22 is a function of the ratio of the width of grooves 26 and the width of the ribs standing between the grooves, and may be adjusted as needed.

Optionally, instead of diffraction grating 24 that is integrated into lens 14, one could also use a separate diffraction grating. However, the design shown in FIG. 1 has the advantage of permitting simple manufacturing and assembly, and of ensuring that, if lens 14 is correctly calibrated, diffraction grating 24 is, at the same time, correctly calibrated.

Secondary beam 22, for example, may be utilized for a direct measurement of the speed of the vehicle over the ground. Since the point where secondary beam 22 hits roadway 28 is at a relatively short distance from the vehicle, a sufficiently strong echo of reflection centers P is received, which are formed by surface unevennesses in roadway 28. The relative speed of the reflection centers P, that may be determined by the Doppler effect, directly gives the initial speed of the vehicle. Besides that, measuring the distance between radar sensor 10 and reflection centers P, that is, the point where secondary beam 22 hits the roadway, makes it possible to control the vertical calibration of radar sensor 10.

Furthermore, secondary beam 22 may be used to detect a possible loss of sight of radar sensor 10. If, for example, the upper half of lens 14 is encrusted with snow, ice or slush, and if therefore the intensity of main beam 20 is weakened to the extent that no reliable locating of obstacles is possible any more, the intensity of the secondary beam will also be weakened in the same manner and, in the light of the intensity of the echo of reflection centers P, which, with the aid of the known distance is identifiable, the extent of the loss of sight may be determined, in particular even if main beam 20 is not locating any preceding vehicles.

Figure 2:
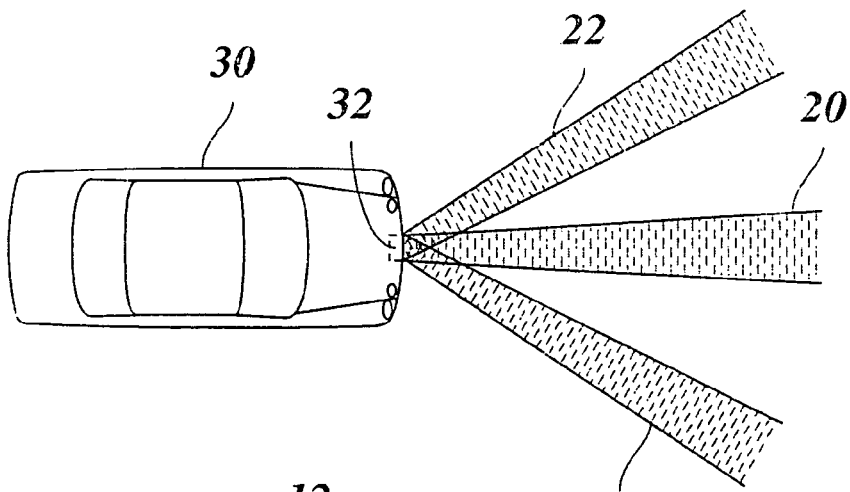
FIG. 2 shows a vehicle having a radar sensor according to another exemplary embodiment, in a top view.

FIG. 2 shows the outline of a motor vehicle 30, having a radar sensor 32 that is constructed according to the same principle as radar sensor 10 as in FIG. 1. However, in radar sensor 32 the diffraction grating is oriented vertically and is symmetrically constructed, and is, in this context, designed in such a way that, besides main beam 20, two secondary beams 22, 22' are generated, which correspond to the two secondary maxima. Secondary beams 22, 22' may be used in this case, for instance, for locating objects in the immediate vicinity of motor vehicle 30, to the left and the right of the vehicle. This makes possible, in particular, the early detection of a driver swinging in.

Figure 3:
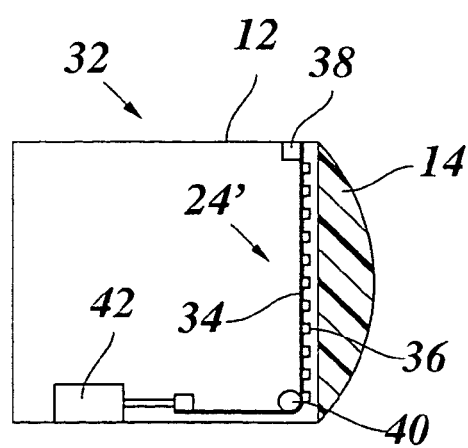
FIG. 3 shows a schematic section through the radar sensor as in FIG. 2.

FIG. 3 shows a conceivable construction of radar sensor 32. Diffraction grating 24' is, in this case, developed separately from lens 14 and is formed by an elastic diaphragm 34 that is equipped with a sequence of grating strips 36. Both diaphragm 34 and grating strips 36 are transparent to the microwave radiation, but grating strips 36 have a higher index of refraction than air. At one end, diaphragm 34 is firmly clamped in a holder 38, and at the other end it is deflected by a deflecting roller 40 and fastened to an electromechanical adjusting drive 42. With the aid of actuating drive 42, diaphragm 34 may be stretched, so that the distance between grating strips is increased, and thereby also the grating constant is increased, with the result that the angle between secondary beams 22, 22' and main beam 20 decreases. In this manner, the radiation angle of secondary beams 22, 22' may be varied in a stepless manner during the operation of the radar sensor.

Finally, a combination of vertical grating 24', as in FIG. 3, with horizontal grating 24, as in FIG. 1, is also conceivable, so that, in addition to main beam 20 and lateral secondary beams 22, 22', as in FIG. 2, one obtains in each case an additional secondary beam that is directed to the roadway in a slantwise manner.

What is claimed is:

1. A radar sensor for a motor vehicle comprising:
   a radar antenna element; and
   an optical system for subdividing a radar beam generated by the antenna element into a plurality of radar beam components that are radiated in different directions, the optical system having a diffraction grating, wherein the diffraction grating is a transmission grating, and wherein the optical system includes a plano-convex lens, the diffraction grating being integrated on the planar surface of the plano-convex lens, and wherein the radar beam components that are radiated in different directions exit the plano-convex lens from the convex surface of the plano-convex lens, and wherein the diffraction grating is made up of an elastic diaphragm having a sequence of grating strips, and a grating constant of the diffraction grating may be varied by applying a variable force to the elastic diaphragm.

2. The radar sensor according to claim 1, wherein the diffraction grating is a blaze grating, which generates only a single secondary beam besides generating a main beam.

3. The radar sensor according to claim 1, wherein the diffraction grating is horizontally oriented, so that a secondary beam is directed slantwise onto a roadway.

4. The radar sensor according to claim 1, wherein the diffraction grating is oriented vertically.

5. The radar sensor according to claim 4, wherein the diffraction grating generates a main beam and exactly two secondary beams lying symmetrically to the main beam.

6. A radar sensor for a motor vehicle comprising:
   a radar antenna element; and
   an optical system for subdividing a radar beam generated by the antenna element into a plurality of radar beam components that are radiated in different directions, the optical system having a plano-convex lens and a diffraction grating integrated into the lens, wherein:
   the diffraction grating is a transmission grating;
   the diffraction grating is a blaze grating, which generates only a single secondary beam besides generating a main beam, the diffraction grating being integrated on the planar surface of the plano-convex lens, and the radar beam components that are radiated in different directions exit the plano-convex lens from the convex surface of the plano-convex lens;
   the diffraction grating is horizontally oriented, so that the secondary beam is directed slantwise onto a roadway, the secondary beam configured for at least one of measuring the absolute speed of the motor vehicle, for calibration control, and for detection of loss of sight; and
   the diffraction grating is made up of an elastic diaphragm having a sequence of grating strips, and a grating constant of the diffraction grating may be varied by applying a variable force to the elastic diaphragm.

7. The radar sensor according to claim 6, further comprising a control device configured for dynamically varying the grating constant of the diffraction grating.

8. The radar sensor according to claim 7, wherein the control device is electronically controlled during an operation of the radar sensor.

9. A radar sensor for a motor vehicle, comprising:
   an antenna element; and
   an optical system for subdividing a radar beam generated by the antenna element into a plurality of beam components that are radiated in different directions, the optical system having a diffraction grating, wherein the diffraction grating is a transmission grating, and wherein the optical system includes a plano-convex lens;
   wherein a grating constant of the diffraction grating may be varied, and wherein the diffraction grating is made up of an elastic diaphragm having a sequence of grating strips, and the grating constant of the diffraction grating may be varied by applying a variable force to the elastic diaphragm.

10. The radar sensor according to claim 9, further comprising a control device configured for dynamically varying the grating constant of the diffraction grating.

11. The radar sensor according to claim 10, wherein the control device is electronically controlled during an operation of the radar sensor.

* * * * *